United States Patent
Murata et al.

(10) Patent No.: US 7,101,299 B2
(45) Date of Patent: Sep. 5, 2006

(54) STARTER WITH PLANETARY REDUCTION GEAR DEVICE

(75) Inventors: Mitsuhiro Murata, Niwa-gun (JP); Tsutomu Shiga, Nukata-gun (JP); Masanori Ohmi, Anjo (JP); Masahiro Morita, Nukata-gun (JP)

(73) Assignee: Denso Corporation, Kariya (JP)

( * ) Notice: Subject to any disclaimer, the term of this patent is extended or adjusted under 35 U.S.C. 154(b) by 49 days.

(21) Appl. No.: 10/802,820

(22) Filed: Mar. 18, 2004

(65) Prior Publication Data
US 2004/0187615 A1 Sep. 30, 2004

(30) Foreign Application Priority Data
Mar. 31, 2003 (JP) .............................. 2003-095880

(51) Int. Cl.
F16H 48/06 (2006.01)

(52) U.S. Cl. ...................... 475/149; 475/330; 475/331

(58) Field of Classification Search ................ 475/149, 475/331, 901, 5, 330; 340/384.1, 391.1; 455/128, 347, 349, 350, 567, 575.1; 381/189, 381/391, 394, 395, 396, 412, 414, 423, 424, 381/429, 431
See application file for complete search history.

(56) References Cited

U.S. PATENT DOCUMENTS

| | | | | |
|---|---|---|---|---|
| 3,527,121 A | * | 9/1970 | Moore | 475/338 |
| 3,885,995 A | * | 5/1975 | Cunningham et al. | 148/217 |
| 4,249,964 A | * | 2/1981 | Bambuch et al. | 148/217 |
| 4,825,723 A | * | 5/1989 | Martin | 475/332 |
| 5,115,689 A | * | 5/1992 | Isozumi et al. | 74/7 C |
| 5,319,989 A | * | 6/1994 | Burch | 74/7 E |
| 5,470,286 A | * | 11/1995 | Fan | 475/331 |
| 5,609,542 A | * | 3/1997 | Kusumoto et al. | 475/331 |
| 5,649,879 A | * | 7/1997 | Kusumoto et al. | 475/331 |
| 5,898,229 A | * | 4/1999 | Murata et al. | 290/48 |
| 6,333,567 B1 | | 12/2001 | Shiroyama et al. | |
| 6,434,827 B1 | * | 8/2002 | Trent et al. | 29/893.1 |

FOREIGN PATENT DOCUMENTS

| | | |
|---|---|---|
| EP | 0 086 494 | 8/1983 |
| JP | A 58-77952 | 5/1983 |
| JP | A-58-140468 | 8/1983 |
| JP | U-58-140348 | 9/1983 |

(Continued)

OTHER PUBLICATIONS

Japanese Office Action, Application No. 2003-095880, Apr. 19, 2006 w/English-language translation.

*Primary Examiner*—Charles A Marmor
*Assistant Examiner*—Justin K. Holmes
(74) *Attorney, Agent, or Firm*—Oliff & Berridge, PLC

(57) ABSTRACT

In a planetary reduction gear device of a starter, a planet carrier forms gear shafts and planetary gears are rotatably supported by the gear shafts through bearings. The planet carrier further forms waste shafts projecting in a direction same as that of the gear shafts. The waste shafts are arranged on a circle having a center coincident with a rotation axis of the clutch outer portion at regular intervals in a circumferential direction. The circle on which the waste shafts are arranged has a diameter different from that of a circle on which the gear shafts are arranged. A speed reduction ratio can be changed by mounting planetary. gears having a gear specification different from that of the planetary gears supported on the gear shafts on the waste shafts. The planet carrier can be integrally formed with a clutch outer portion of a one-way clutch.

4 Claims, 4 Drawing Sheets

FOREIGN PATENT DOCUMENTS

| | | |
|---|---|---|
| JP | A-2000-097140 | 4/2000 |
| JP | A-2001-298901 | 10/2001 |
| JP | A-2002-039327 | 2/2002 |
| JP | A-2002-346846 | 12/2002 |

* cited by examiner

STARTER WITH PLANETARY REDUCTION GEAR DEVICE

CROSS REFERENCE TO RELATED APPLICATION

This application is based on Japanese Patent Application No. 2003-95880 filed on Mar. 31, 2003, the disclosure of which is incorporated herein by reference.

FIELD OF THE INVENTION

The present invention relates to a starter having a planetary reduction gear device.

BACKGROUND OF THE INVENTION

Generally, a planetary reduction gear device used in a starter is constructed of a sun gear, an internal gear and planetary gears. The sun gear is provided on a rotation shaft of a motor. The internal gear is in a form of ring and is arranged concentric with the sun gear. The planetary gears are rotatably supported by gear shafts and engage with the sun gear and the internal gear.

When the sun gear rotates with the motor, the planetary gears rotate and revolute. The revolution movement of the planetary gears are transmitted to a planet carrier through the gear shafts, thereby to rotate the planet carrier. Accordingly, the rotation force of the motor is outputted from the planet carrier after the rotation speed is reduced by the revolution movement of the planetary gears. This kind of planetary reduction gear device is for example disclosed in Japanese Unexamined Patent Publication No. JP-A-58-77952.

In recent years, an engine needs to produce high power output and improve fuel efficiency. With this, the starter is required to vary an internal speed reduction ratio so as to meet a wide range of engine loads. In the above planetary reduction gear device, however, the gear shafts are arranged on a circle having a center that is coincident with a rotation axis of the planet carrier. Therefore, specifications of planetary gears, which can be mounted on the planet carrier, are limited. That is, it is difficult to change the speed reduction ratio by mounting planetary gears having different gear specification to the same planet carrier.

Also, the gear shafts are integrally formed into the planet carrier. A cross-sectional area of the gear shafts is generally smaller than that of the carrier. Therefore, when the planet carrier and the gear hafts are formed by cold forging, because the cross-sectional areas are different largely, a stress of a die is increased. As a result, the die is likely to be broken. Also, processing accuracy of the gear shafts, that is, accuracy of the diameter and length of the gear shafts, is likely to be reduced.

SUMMARY OF THE INVENTION

The present invention is made in view of the foregoing matters, and it is an object of the present invention to provide a starter having a planetary reduction gear device capable of changing a speed reduction ratio.

According to the present invention, a starter has a planetary reduction gear device that reduces a rotation speed of a motor. The planetary reduction gear device has a planet carrier forming gear shafts projecting from the surface of the planet carrier and a plurality of planetary gears rotatably supported by the gear shafts. The planet carrier further forms projections projecting in a direction same as the gear shafts.

Accordingly, since the predetermined projections are integrally formed into the planet carrier, stress of a die while producing the planet carrier such as by cold forging is reduced. Therefore, the life of the die is improved. As a result, manufacturing costs can be reduced.

Preferably, the projections are arranged on a circle having a center that is coincident with a rotation axis of the planet carrier. The circle on which the projections are arranged has a diameter different from that of a circle on which the gear shafts are arranged. Accordingly, the projections are used as secondary gear shafts. That is, planetary gears that have a specification different from the planetary gears supported on the gear shafts can be supported on the projections. Therefore, the speed reduction ratio can be changed.

BRIEF DESCRIPTION OF THE DRAWINGS

Other objects, features and advantages of the present invention will become more apparent from the following detailed description made with reference to the accompanying drawings, in which like parts are designated by like reference numbers and in which.

DETAILED DESCRIPTION OF EMBODIMENTS

Figure 1:
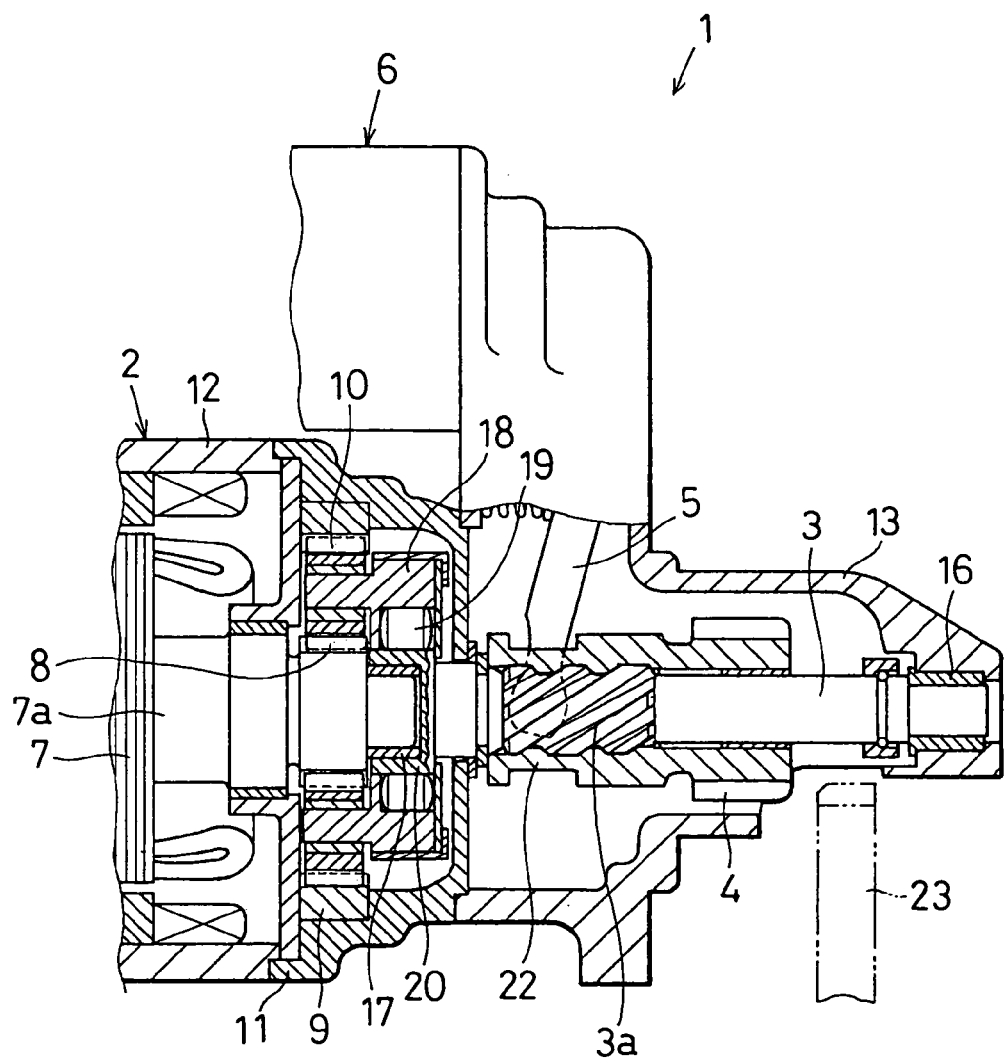
FIG. 1 is a cross-sectional view of a starter according to a first embodiment of the present invention.

Embodiments of the present invention will be described hereinafter with reference to the drawing.

Referring to FIG. 1, a starter 1 of the embodiment is constructed of a motor 2, an output shafts 3, a one-way clutch, a pinion gear 4, a shift lever 5, an electromagnetic switch 6 and the like. The motor 2 generates a rotational force and the planetary reduction gear device reduces a speed of the rotation from the motor 2. The output shaft 3 is coaxially aligned with a rotation shaft of the motor 2. The one-way clutch receives the rotation from the planetary reduction gear device and transmits the rotation to the output shaft 3. The pinion gear 4 is provided on the output shaft 3. The electromagnetic switch 6 switches on and off an electric current to the motor 2 and moves the pinion gear 4 in an axial direction through the shift lever 5.

The motor 2 is a well-known d.c. motor. When a motor contact (not shown) accommodated in the electromagnetic switch 6 is closed, electric power is supplied from a vehiclemounted battery to an armature 7, and therefore a rotational force is generated in the armature 7.

The planetary reduction gear device is constructed of a sun gear 8 formed on a rotation shaft 7a of the motor 2, a ring-shaped internal gear 9 having internal teeth and a plurality of planetary gears 10 (three in the embodiment) engaging with the sun gear 8 and the internal gear 9. The rotation speed of the armature 7 is reduced through the rotation (rotational movement and revolution movement) of the planetary gears 10.

The internal gear 9 is arranged concentric with the sun gear 8 and held in a center case 11 in a manner that the rotation of the internal gear 9 is restricted. The center case 11 is held between a yoke 12 of the motor 2 and a front housing 13. The center case 11 surrounds the outer peripheries of the planetary reduction gear device and the one-way clutch.

Figure 2:
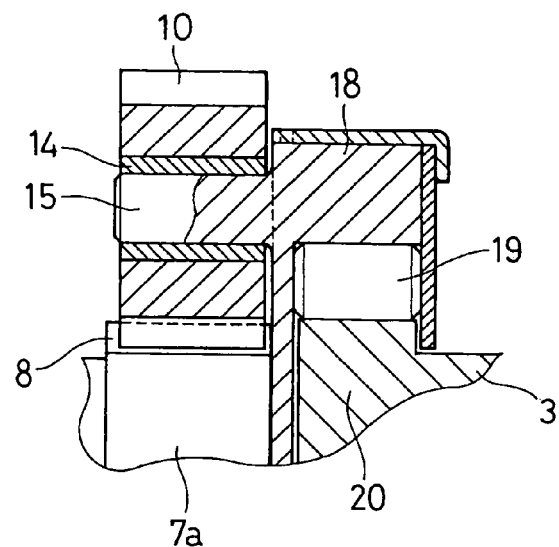
FIG. 2 is a partial cross-sectional view of a planetary reduction gear device and a one-way clutch according to the first embodiment of the present invention.

As shown in FIG. 2, the planetary gears 10 are rotatably supported by gear shafts 15 provided on a planet carrier (a clutch outer portion 18) through bearings 14. The revolution movement of the planetary gears 10 is transmitted to the planet carrier. Here, the gear shafts 15 are integrally formed into the planet carrier.

Regarding the output shaft 3, the front end (right end in FIG. 1) is rotatably supported through a front bearing 16 in a front housing 13. Also, a recessed portion is formed in the rear end (left end in FIG. 1) of the output shaft 3. The front end of the rotation shaft 7a is rotatably engaged within the recessed portion of the output shaft 3 through a rear bearing 17. Male helical splines 3a are formed on the outer periphery of the output shaft 3 that extends forward (right side in FIG. 1) from the center case 11.

The one-way clutch is a well-known roller-type clutch, and is constructed of the clutch outer portion 18, a roller 19, a clutch inner portion 20, and the like. The clutch outer portion 18 is integrally formed with the planet carrier. The clutch outer portion 18 rotates by receiving the revolution movement of the planetary gears 10 through the gear shafts 15.

Figure 3A:
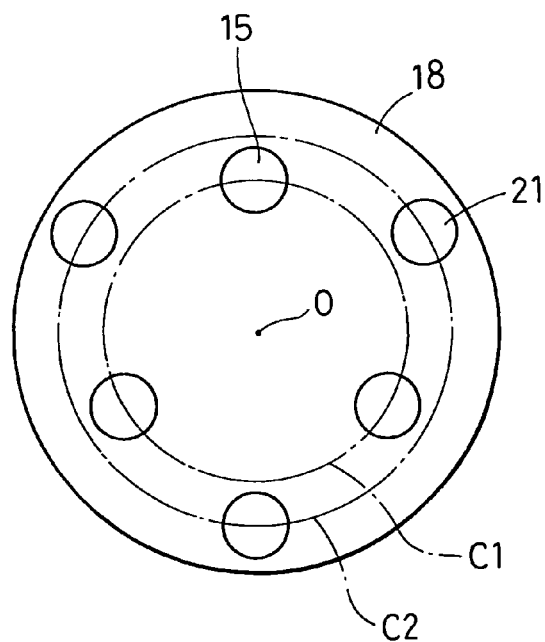
FIG. 3A is a plan view of a clutch outer portion, viewed in an axial direction, for showing arrangement of gear shafts and waste shafts according to the first embodiment of the present invention.
Figure 3B:
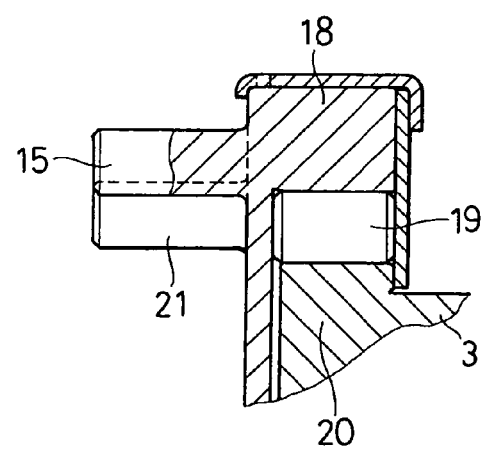
FIG. 3B is a partial cross-sectional view of the one-way clutch according to the first embodiment of the present invention.

As shown in FIG. 3A, the clutch outer portion 18 is provided with three projections (hereinafter, referred to as waste shafts) 21 in addition to the three gear shafts 15. Each of the waste shafts 21 is in a form of pin having a circular-shaped cross-section with a diameter substantially same as that of the gear shaft 15. The waste shaft 21 projects in a direction same as the gear shaft 15. A height (projection length) of the waste shaft 21 is the same as that of the gear shaft 15, as shown in FIG. 3B.

As shown in FIG. 3A, the three waste shafts 21 are arranged on a second circle C2 having a center that is coincident with a rotation axis O of the clutch outer portion 18 and at equal intervals in a circumferential direction. Also, the waste shafts 21 are arranged at positions without interfering with the planetary gears 10 supported by the gear shafts 15. Here, the second circle C2 on which the waste shafts 21 are arranged has a diameter different from that of a first circle C1 on which the gear shafts 15 are arranged. In the embodiment, the diameter of the second circle C2 is greater than that of the first circle C1. Alternatively, the diameter of the second circle C2 can be smaller than that of the first circle C1.

Figure 4:
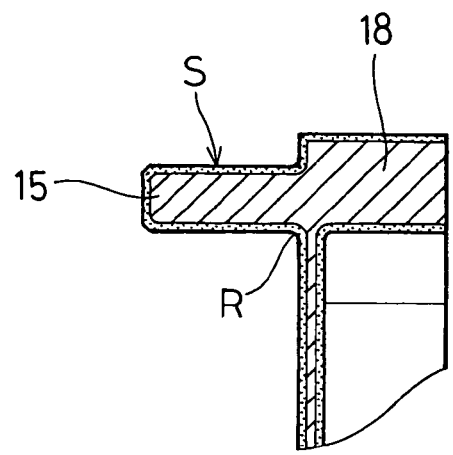
FIG. 4 is a partial cross-sectional view of the one-way clutch for showing a heat-treated layer according to the first embodiment of the present invention.

For example, the clutch outer portion 18, which forms the gear shafts 15 and the waste shafts 21, is produced by cold forging. After the cold forging, the clutch outer portion 18 is entirely heat-treated. By the heat-treatment, a heat-treated layer S having a hardness equal to or higher than 50 HRC is formed on the entire surface of the clutch outer portion 18, as shown in FIG. 4. That is, the heat-treated layer S is also formed on the surfaces of the gear shafts 15 and the waste shafts 21.

In the one-way clutch, the roller 19 is arranged in a cam chamber (not shown) defined in an inner periphery of the clutch outer portion 18. When the clutch outer portion 18 rotates, the roller 19 is held between the inner peripheral wall of the clutch outer portion 18 and an outer peripheral wall of the clutch inner portion 20 and the torque is transmitted to the clutch outer portion 18 to the clutch inner portion 20 through the roller 19. The clutch inner portion 20 is provided on the rear end of the output shaft 3. When the torque is transmitted to the clutch inner portion 20 from the clutch outer portion 18 through the roller 19, the output shaft 3 rotates.

The pinion gear 4 is integrally formed with a spline tube 22. Female helical splines are formed on an inner periphery of the spline tube 22 and engage with the male helical splines 3a of the output shaft 3.

The electromagnetic switch 6 has a coil (not shown) electrically conducted by a switching operation of a starting switch and a plunger (not shown) reciprocating inside of the coil. When the coil is excited, the plunger is attracted by receiving a magnetic force. When the plunger is attracted, the pinion gear 4 is pushed in a direction opposite to the motor (to the right side in FIG. 1) through the shift lever 5 connected to the plunger, and the motor contact is closed.

Next, operation of the starter 1 will be described.

When the coil of the electromagnetic switch 6 is excited and the plunger is attracted by the switching ON operation of the starting switch, an advancing force is applied to the pinion gear 4 through the shift lever 5. By this, the female helical splines of the spline tube 22 move along the male helical splines 3a of the output shaft 3, so the pinion gear 4 moves forward while rotating. The pinion gear 4 contacts a ring gear of the engine and then temporarily stops.

On the other hand, when the motor contact is closed by the movement of the plunger, the armature 7 is electrically conducted and starts to rotate. The rotation of the armature 7 is transmitted to the output shaft 3 through the one-way clutch after the speed of the rotation is reduced by the planetary reduction gear device. By this, the pinion gear 4 rotates with the output shaft 3 and engages with the ring gear 23. The pinion gear 4 transmits the rotation to the ring gear 23, and therefore the engine is cranked.

After cranking the engine, when the starting switch is turned off by switching OFF operation of the starting switch, the electric power supply to the coil is stopped and the magnetic force (attraction force) disappears. Therefore, the plunger returns by receiving a reaction force of a spring (not shown). With this, the motor contact is opened and the electric power supply to the armature 7 is stopped. Thus, the rotation of the armature 7 is stopped.

Further, as the plunger returns, a returning force is applied to the pinion gear 4 through the shift lever 5. As a result, the pinion gear 4 separates from the ring gear 23 and moves backward along the output shaft 3. Then, the pinion gear 4 stops at a stationary position shown in FIG. 1.

In the planetary reduction gear device employed to the above starter 1, three waste shafts 21 are integrally formed with the planet carrier (clutch outer portion 18) in addition to the three gear shafts 15. In this construction, the waste shafts 21 can be used as secondary gear shafts. That is, planetary gears having a specification different from that of the planetary gears 10 supported by the gear shafts 15 can be mounted on the secondary gear shafts 21. Accordingly, the speed reduction ratio can be changed without changing the planet carrier 18.

In a case that the gear shafts are provided separately from the planet carrier, if the heat-treated gear shafts are press-fitted to the heat-treated planet carrier, stress caused during the press-fitting is likely to be excessively increased, resulting in defects such as cracks to the planet carrier. Therefore, when the gear shafts are formed separately from the planet carrier, only the gear shafts are generally heat-treated. In this case, however, the end surface on which the planetary gears slide is likely to be worn. Further, when the gear shafts receive load, the peripheries of the holes into which the gear shafts are press-fitted receive pressure. As a result, the peripheries of the holes are likely to be buckled, and further the gear shafts are removed from the planet carrier.

On the other hand, in the first embodiment, since the gear shafts 15 and the waste shafts 21 are integrally formed into the planet carrier (clutch outer portion) 18, it is unnecessary to press-fit the gear shafts 15 and the waste shafts 21 to the planet carrier 18. Therefore, the heat treatment is applied entirely to the planet carrier 18. The heat-treated layer S having the hardness equal to or higher than 50 HRC is formed on the surfaces of the gear shafts 15, the waste shafts 21 and the planet carrier 18. Accordingly, abrasion on the end surface of the clutch outer portion 18 on which the planetary gears 10 slide can be reduced. Further, the defects of the clutch outer portion 18 such as cracks, wear, or buckling are reduced.

In a case that the gear shafts are provided separately from the planet carrier, if the gear shafts are press-fitted to the planet carrier, the end surface of the planet carrier and the side surface of the gear shaft cross perpendicularly. If notches and the like are created at the press-fitting portion of the gear shafts, the strength is easily reduced.

On the other hand, in the first embodiment, since the gear shafts 15 and the waste shafts 21 are integrally formed into the clutch outer portion 18. R portions are applied to the base portion of each of the gear shafts 15 and the waste shafts 21 with respect to the clutch outer portion 18. That is, the base portion of the each of the gear shafts 15 and the waste shafts 21 that continues to the end face of the clutch outer portion 18 forms a rounded corner R, as shown in FIG. 4. Accordingly, it is less likely that cracks will be formed on the clutch outer portion 18. As a result, the strength of the gear shafts 15 and the waste shafts 21 can be increased.

In a case that the gear shafts are press-fitted to the clutch outer portion of the one-way clutch, in general, the carburize-restricting treatment is applied to the holes of the clutch outer portion into which the gear shafts are press-fitted and the carburization treatment is applied to the gear shafts. Thereafter, the carburized gear shafts are press-fitted to the clutch outer portion.

On the other hand, in the first embodiment, since the gear shafts 15 and the waste shafts 21 are integrally formed into the clutch outer portion 18. Since it is not necessary to press-fit the gear shafts 15 and the waste shafts 21 to the clutch outer portion 18, carburizing-restricting treatment, which is generally expensive, is not required. Accordingly, the clutch outer portion 18 and the planet carrier can be produced at reduced cost.

Also, since both of the gear shafts 15 and the waste shafts 21 are integrally formed by forming the clutch outer portion 18 by cold forging, it is possible to optionally set the stress applied to the die. Therefore, as compared with the case in which only the gear shafts 15 are integrally formed with the clutch outer portion 18, the life of the die can be improved.

Here, since the clutch outer portion 18 is produced by cold forging, the metal flow is not cut. That is, the planet carrier has continuous metal flow from the clutch outer portion 18 to the gear shafts 15 and the waste shafts 21. Therefore, the strength of the planet carrier and the clutch outer portion 18 is further improved. Also, since the clutch outer portion and the planet carrier 18 are produced with a reduced amount of material, the manufacturing costs can be reduced. In addition, the gear shafts 15 and the waste shafts 21 can be reduced in size, and designing flexibility is improved.

Further, since the waste shafts 21 are formed at the positions without interfering with the planetary gears 10 supported by the gear shafts 15, it is not necessary to post-process the waste shafts 21, such as by cutting.

(Second Embodiment)

Figure 5:
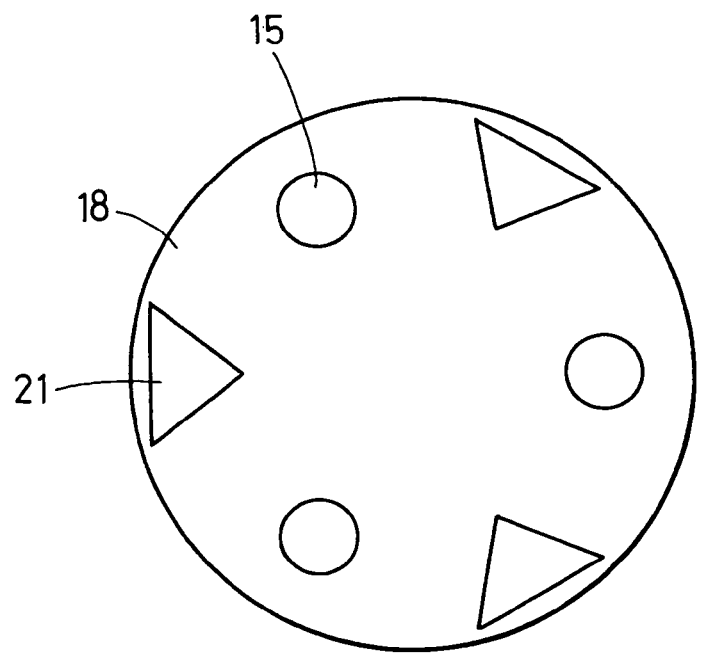
FIG. 5 is a plan view of the clutch outer portion for showing arrangement of the gear shafts and the waste shafts according to the second embodiment of the present invention.

In the second embodiment, as shown in FIG. 5, each of the waste shafts 21 has a polygonal-shaped cross-section such as a triangle-shaped cross-section, instead of the circular-shaped cross-section of the first embodiment. The cross-sectional shape of the waste shaft 21 is not limited to the circular shape.

When the waste shafts 21 are used as the secondary gear shafts, the external shapes of the waste shafts 21 are processed so that the bearings can engage with the waste shafts 21. Alternatively, the bearings are driven into the waste shafts 21 and the external shapes of the bearings are shaped into substantially cylindrical shapes. The gear shafts 15 and the waste shafts 21 are integrally formed into the clutch outer portion 18 and arranged in a manner similar to the first embodiment.

(Third Embodiment)

In the third embodiment, the planet carrier and the clutch outer portion of the one-way clutch are separately provided.

Figure 6:
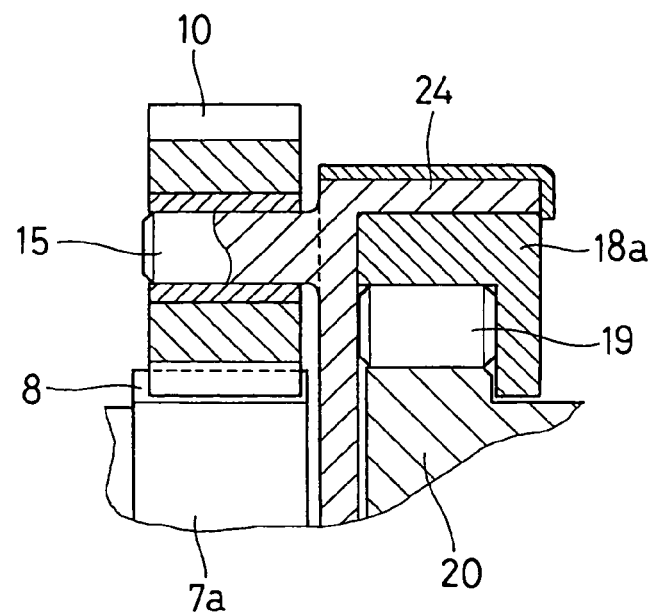
FIG. 6 is a partial cross-sectional view of the planetary reduction gear device and the one-way clutch according to a third embodiment of the present invention.

As shown in FIG. 6, the planetary reduction gear device has a planet carrier 24 into which the gear shafts 15 and waste shafts (not shown) are integrally formed. A clutch outer portion 18a, which functions in a manner similar to the clutch outer portion 18 of the first embodiment, is provided as a separate part from the planet carrier 24. The clutch outer portion 18a and the planet carrier 24 are connected to each other in a relative rotation restricted manner. That is, the clutch outer portion 18a rotates with the planet carrier 24.

Also in the third embodiment, the gear shafts 15 and the waste shafts are integrally formed into the planet carrier 24 and arranged in a manner similar to the first embodiment. Therefore, the waste shafts can be used as the secondary gear shafts. Similar to the first embodiment, the speed reduction ratio can be changed by mounting the planetary gears having the different specification to the waste shafts. Accordingly, advantages similar to the first embodiment and the second embodiments can be provided in the third embodiment.

(Fourth Embodiment)

Figure 7:
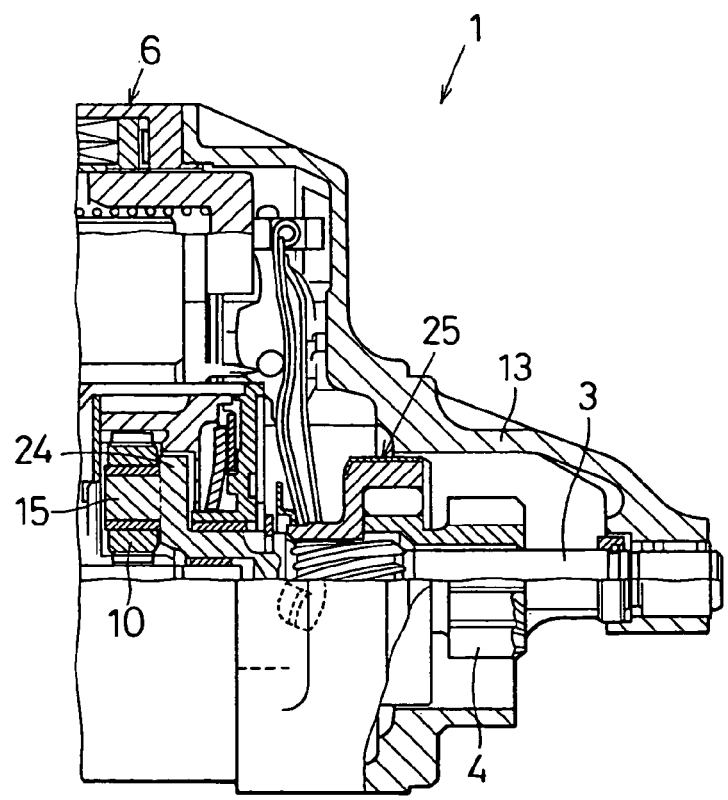
FIG. 7 is a cross-sectional view of a starter according to a fourth embodiment of the present invention.

As shown in FIG. 7, the starter 1 of the fourth embodiment has the planet carrier 24 into which the gear shafts 15 and the waste shafts (not shown) are integrally formed in a manner similar to the first embodiment. Further, the planet carrier 24 is provided as the part of the output shaft 3. A one-way clutch 25 is arranged movable along the output shaft 3 with the pinion gear 4.

Also in the fourth embodiment, since the gear shaft 15 and the waste shafts are integrally formed into the planet carrier 24, the waste shafts are used as the secondary shafts. Therefore, the speed reduction ratio can be changed by mounting the planetary gears having different gear specification to the secondary shafts.

The present invention is not limited to the above embodiments, but may be implemented in other ways without departing from the spirit of the invention.

What is claimed is:

1. A starter, comprising:

a motor generating a rotation force; and a planetary reduction gear device that reduces a speed of rotation of the motor, wherein the planetary reduction gear device has a planet carrier that has a first surface and a second surface opposite to each other and forms gear shafts projecting from the first surface and a plurality of planetary gears supported by the gear shafts, the planet carrier further forming projections projecting from the first surface in a direction same as that of the gear shafts, the projections and the gear shafts are integrally formed with the planet carrier, and each of the gear shafts and the projections is disposed such that a base portion connecting to the surface of the planet carrier forms a rounded corner.

2. A starter, comprising:

a motor generating a rotation force; and a planetary reduction gear device that reduces a speed of rotation of the motor, wherein the planetary reduction gear device has a planet carrier that has a first surface and a second surface opposite to each other and forms gear shafts projecting from the first surface and a plurality of planetary gears supported by the gear shafts, the planet carrier further forming projections projecting from the first surface in a direction same as that of the gear shafts, the projections and the gear shafts are integrally formed with the planet carrier, the gear shafts are arranged on a first circle having a center that is coincident with a rotation axis of the planet carrier and the projections are arranged on a second circle having a center that is coincident with the rotation axis of the planet carrier, wherein the second circle has a diameter different from that of the first circle and each of the gear shafts and the projections is disposed such that a base portion connecting to the surface of the planet carrier forms a rounded corner.

3. A starter, comprising:

a motor generating a rotation force; and a planetary reduction gear device that reduces a speed of rotation of the motor, wherein the planetary reduction gear device has a planet carrier forming gear shafts projecting from a surface of the planet carrier and a plurality of planetary gears supported by the gear shafts, the planet carrier further forming projections projecting in a direction same as that of the gear shafts, and each of the gear shafts and the projections is disposed such that a base portion connecting to the surface of the planet carrier forms a rounded corner.

4. The starter according to claim 3, wherein the gear shafts are arranged on a first circle having a center that is coincident with a rotation axis of the planet carrier and the projections are arranged on a second circle having a center that is coincident with the rotation axis of the planet carrier, wherein the second circle has a diameter different from that of the first circle.

* * * * *